United States Patent [19]
Watanabe et al.

[11] Patent Number: 5,472,063
[45] Date of Patent: Dec. 5, 1995

[54] FRONT BODY STRUCTURE OF AUTOMOTIVE VEHICLE

[75] Inventors: Shigeaki Watanabe, Hiroshima; Shuichi Nakagami, Higashihiroshima; Hidemitsu Yamatoya, Hiroshima; Yoshie Morino, Kure; Michitaka Ohta, Hiroshima, all of Japan

[73] Assignee: Mazda Motor Corporation, Hiroshima, Japan

[21] Appl. No.: 113,624

[22] Filed: Aug. 31, 1993

Related U.S. Application Data

[62] Division of Ser. No. 872,233, Apr. 23, 1992, Pat. No. 5,267,630.

[30] Foreign Application Priority Data

Apr. 23, 1991 [JP] Japan ................................ 3-092187
Jun. 24, 1991 [JP] Japan ................................ 3-180165

[51] Int. Cl.$^6$ .......................... B60K 28/14; B60K 5/04
[52] U.S. Cl. .................... 180/274; 180/297; 280/784; 296/189
[58] Field of Search ................................ 180/297, 299, 180/300, 312, 902, 274, 298; 296/194, 198, 203, 188, 189; 280/784

[56] References Cited

U.S. PATENT DOCUMENTS

| | | | |
|---|---|---|---|
| 4,263,980 | 4/1981 | Harlow, Jr. et al. | 180/297 X |
| 4,406,343 | 9/1983 | Harasaki | 180/297 |
| 4,408,794 | 10/1983 | Harasaki | 296/198 |
| 4,753,315 | 6/1988 | Fujisaki et al. | 180/312 X |
| 4,899,843 | 2/1990 | Takano et al. | 180/312 |
| 4,919,474 | 4/1990 | Adachi et al. | 296/198 X |
| 4,955,663 | 9/1990 | Imura | 296/204 X |
| 5,011,201 | 4/1991 | Takahashi et al. | 296/204 X |
| 5,024,482 | 6/1991 | Harasaki et al. | 296/198 X |
| 5,133,427 | 7/1992 | Arvidsson et al. | 180/297 |
| 5,180,206 | 1/1993 | Toyoda | 296/204 |
| 5,267,630 | 12/1993 | Watanabe et al. | 180/312 X |
| 5,372,216 | 12/1994 | Tsuji et al. | 180/274 |

FOREIGN PATENT DOCUMENTS

| | | | |
|---|---|---|---|
| 0178931 | 11/1982 | Japan | 180/312 |
| 0063577 | 4/1983 | Japan | 296/198 |
| 58-63577 | 4/1983 | Japan | 296/198 |
| 62-52081 | 3/1987 | Japan | |
| 0106121 | 5/1988 | Japan | 180/297 |
| 63-145124 | 6/1988 | Japan | |
| 0219422 | 9/1988 | Japan | 180/297 |
| 1-36583 | 2/1989 | Japan | 296/198 |
| 0036583 | 7/1989 | Japan | 296/198 |
| 2-147480 | 6/1990 | Japan | 296/203 |
| 0147480 | 6/1990 | Japan | 296/203 |
| 0054028 | 3/1991 | Japan | 180/300 |
| 1708674 | 1/1992 | U.S.S.R. | 280/784 |

*Primary Examiner*—Brian L. Johnson
*Attorney, Agent, or Firm*—Keck, Mahin & Cate

[57] ABSTRACT

A front body structure of a vehicle, in which a power plant is installed, includes a reinforcement secured to a mounting portion of a wheel housing located where an engine mounting bracket is attached. The front body structure also includes another reinforcement, for connecting the reinforcement to a suspension tower, which connects the reinforcement to the wheel housing. The other reinforcement is smaller in plate thickness than the reinforcement so as to absorb impact force applied to the front body during a front end collision. A front frame reinforcement is secured to a front side frame so as to reinforce a portion of the front side frame at a location in which a cut-away portion is formed so as to compensate for a decrease in structural strength of the front side frame. A connecting member connects the power-plant to a rigid structural member so as to suppress a movement of the power-plant during a front end collision.

6 Claims, 17 Drawing Sheets

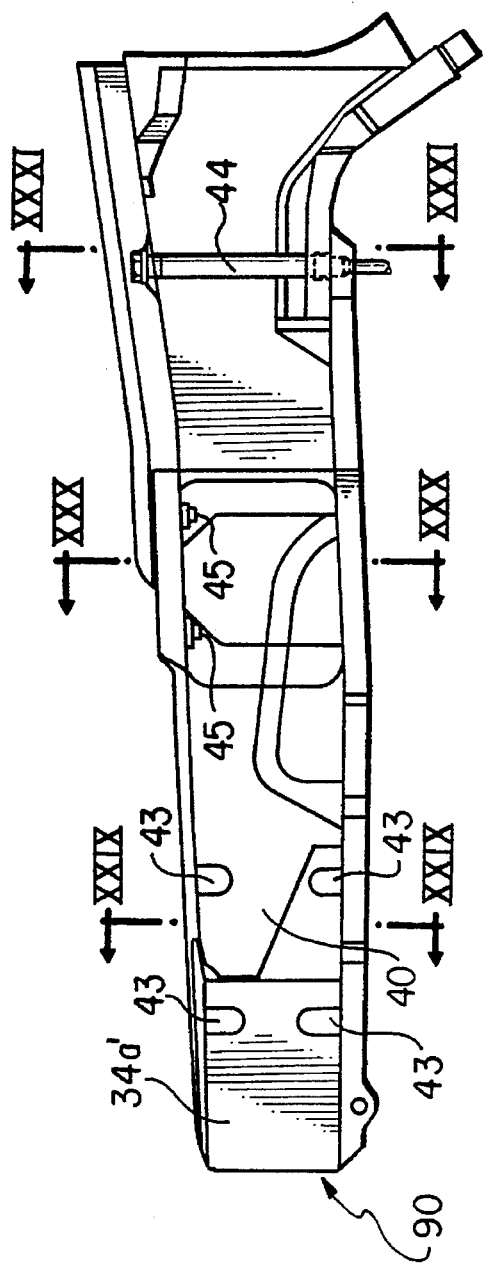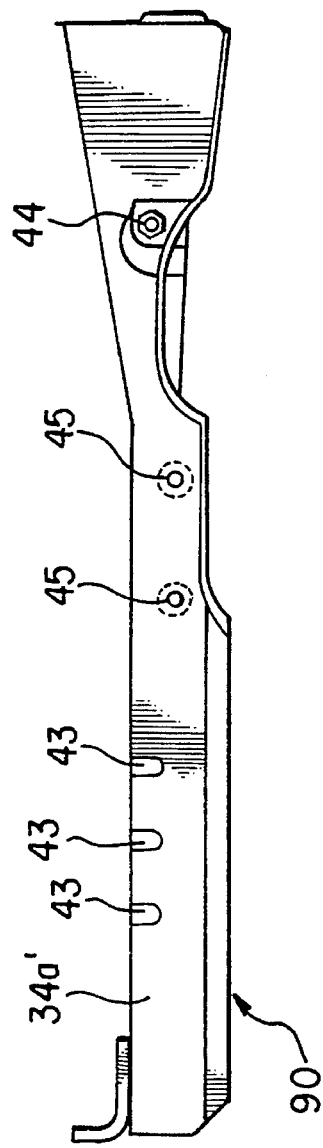
FIG. 27
FIG. 28

FRONT BODY STRUCTURE OF AUTOMOTIVE VEHICLE

This is a divisional of application Ser. No. 07/872,233, filed Apr. 23, 1992, now U.S. Pat. No. 5,267,630.

BACKGROUND OF THE INVENTION

1. Field of the Invention

The present invention relates to a structure of the front portion of a vehicle body for an automotive vehicle and, more particularly, to a front body structure of an automotive vehicle body in which an engine mounting structure is reinforced.

Typically, front bodies of an automotive vehicle include a pair of, or right and left, front wheel housings, a pair of, or right and left, front suspension towers, each front suspension being secured to the front wheel housing tower, and a pair of, or right and left, front side frames, each front side frame extending in a lengthwise direction of the vehicle body and being secured to a lower portion of the front wheel housing. In such a front body structure, a plurality of mounting brackets mount a power-plant, including at least an engine and a transmission, in the engine room. One of the plurality of mounting brackets is provided in association either with the front wheel housing or with the front side frame close to the front wheel housing. If the front wheel housing has a mounting bracket attached to it, portion of the front wheel housing where the mounting bracket is attached must be structurally reinforced. In order for the front wheel housing to reinforce the mounting portion, it is typical to provide a reinforcement primarily welded to the portion of the front wheel housing and secondarily welded to the front side frame and a suspension tower at its lower and upper portions, respectively. Such a front body structure is known from, for instance, Japanese Unexamined Utility Model Publication No. 62-52081.

2. Description of Related Art

Upon a front end collision of an automotive vehicle, impact load acting on the power-plant is applied to the front wheel housing through the mounting bracket. If the mounting portion of the front wheel housing is over reinforced in structural strength, the impact load is transmitted to front pillars and a cowl of the front body through a suspension tower and a wheel apron reinforcement via a mounting bracket. As a result, the front body is subjected to an decrease in the certainty with which a front wind-shield glass is held. On the other hand, if the mounting portion of the front wheel housing is insufficiently reinforced in structural strength, it allows the power-plant to move backward to a large extent during a front end collision. This also adversely affects to the cowl and a dash-board of the front body, thereby lowering the certainty with which the front wind-shield glass is held.

In particular, since front drive automotive vehicles have a power-plant with a crankshaft oriented in a transverse direction of its front body, an interference between the power-plant and either one of the front side frames is easily caused. In such an automotive vehicle, in order to avoid such an interference, the front side frame is formed with a cut-away portion opening to the outside of the front body for defining a space in which the power-plant can move during a front end collision. If a decrease in structural strength of the front side frame due to the cut-away portion is improperly or insufficiently compensated, the front side frame may possibly be deformed or bent upward at the cut-away portion due to an impact load acting thereon during the front end collision. This deformation affects the front pillars and the cowl of the front body, so as also to decrease the certainty with which the front wind shield glass is held.

For instance, as is well known from, for instance, Japanese Unexamined Patent Publication No.63-145124, to mount a power-plant in the front body, mounting means are used, through which the power-plant is supported, at its opposite sides, by the front side frames extending in the length wise direction on opposite sides of the front body and at its front and rear ends by a center member extending in the lengthwise direction below the power-plant. When an automotive vehicle having a power-plant thus mounted therein undergoes a front end crash and, as a result, the center member, which mounts the power-plant thereon, deforms downward at its center portion, the power-plant will sink down. This causes rearward movement of the upper portion of the power-plant to be difficult.

For midship type automotive vehicles, it is a recent tendency to support the power-plant at its rear end portion by a rigid structural member, different from the center member, through a mounting means for space efficiency. In such a front body structure, in which the power-plant is supported at its rear end portion by a rigid structural member different from a center member, it is difficult to deform the rigid structural member upon a front end collision of the automotive vehicle. Consequently, the power-plant tends to turn upward about a mounting portion of the power-plant, at which a rear end of the power-plant is supported by the rigid structural member, as the center member supporting a front end portion of the power-plant bends or deforms downward during a front end collision. In addition, when the front side frame deforms upward during a front end collision, the power-plant tends to move upward. Such a movement of the power-plant causes an interference of the upper portion of the power-plant with a portion of the front body where a dash panel, for dividing an engine room and a passenger compartment, and a front wind shield glass are connected.

SUMMARY OF THE INVENTION

It is a primary object of the present invention to provide an improved front body structure of an automotive vehicle in which a mounting portion of a wheel housing where an engine mounting bracket is attached is properly reinforced.

It is another object of the present invention to provide an improved front body structure of an automotive vehicle in which a front side frame with a cut-away portion is properly reinforced.

It is still another object of the present invention to provide an improved front body structure of an automotive vehicle in which a power-plant supported at its rear end portion by a rigid structural member is forced down with a downward deformation of a center member upon a front end collision for suppressing a turning movement of the power-plant.

These objects are achieved by providing a novel front body structure of a vehicle body for an automotive vehicle which is provided with a wheel housing, a suspension tower connected to the wheel housing, a front side frame extending in a lengthwise direction of the vehicle body on each side of the vehicle body, and an engine mounting bracket secured to a mounting portion of the wheel housing occupying space in front of the suspension tower through which the power-plant is supported by the front side frames. The wheel housing is provided with a mount reinforcement and a connecting reinforcement, both of which are secured to its mounting portion. The connecting reinforcement interconnects the mount reinforcement to the suspension tower and is thinner in plate thickness than the mount reinforcement. The front side frame is secured to a lower end portion of the wheel housing and the mount reinforcement but not to the connecting reinforcement.

Either one of the front side frames is formed, at its middle portion in the lengthwise direction, with a cut-away portion opening to an outside of the vehicle body, so as to allow the power-plant to move without interference with the side front side frame, and is provided with a compensatory reinforcement secured thereto for compensating for a decrease in structural strength of the front side frame due to the provision of the cut-away portion. The engine mounting bracket is disposed on another front side frame.

Because the mount reinforcement is secured to the mounting portion of the wheel housing, which occupies space in front of the suspension tower secured to the wheel housing and where the mounting bracket is secured, and the connection reinforcement, which is thinner than the mount reinforcement and which connects the mount reinforcement to the suspension tower, the mounting portion of the wheel housing is reinforced by both the mount and connection reinforcements. The mount reinforcement is connected to the suspension tower through the connection reinforcement, so as to provide the mount reinforcement with an increased resistance against an impact load caused by a front end collision, thereby suppressing a lengthwise movement of the power-plant during the front end collision so as to increase the certainty with which the front wind shield glass is held and improve the safety of the the front wind shield glass. Since the connection reinforcement is thinner than the mount reinforcement, the connecting strength between the mounting portion of the wheel housing and the suspension tower is not excessive but proper. Consequently, an impact load caused by a front end collision, which is transmitted to the rear of the front body from the mounting bracket through the suspension tower, is suppressed, so as to provide an increase in the certainty with which the front wind shield glass is held and improve the safety of the the front wind shield glass. In addition to connecting the mount reinforcement to the front side frame, which increases the structural strength of the mount reinforcement, not connecting the connection reinforcement to the front side frame lowers the reinforcing strength of the connection reinforcement, so as to promote the non-elastic deformation and the energy absorption of the connection reinforcement during a front end collision.

Center reinforcement restricts an upward movement of the front side frame during a front end collision, so that the front pillars and the cowl of the front body is prevented from deformation, thereby increasing the safety of the wind shield glass. Further, the front side frame is provided with the an extra reinforcement at a portion thereof where the cut-away portion is formed, so as to compensate for a decrease in structural strength of the front side frame due to the provision of cut-away portion in addition to avoiding an interference of the power-plant with the front side frame.

According to another specific embodiment, a front body structure of a vehicle body for an automotive vehicle in which a power-plant is mounted includes, a rigid member disposed behind the power-plant, a center member disposed below the power-plant and extending in a lengthwise direction of the vehicle body, first and second mounting means, and connecting means disposed between said first and second mounting means. The first and second mounting means connect rear and front end portions of the power-plant to the rigid member, respectively. The connecting means, which is disposed between the first and second mounting means and comprises an elastic connecting member, interconnects the power-plant and the center member when a front end collision of the automotive vehicle occurs.

To the front side frames, which are formed so as to deform upward at their center portion when a front end collision occurs the power-plant is connected at opposite sides by third and fourth mounting means.

In this embodiment, because of the provision of the connecting member between the power-plant and the center member, the power-plant is pulled downward together with the downward deformation of the center member, so as to be suppressed in upward turning movement. Consequently, an interference between the power-plant and the interconnected portion of the front body between the dash panel and the wind shield glass is effectively avoided. In addition, because the connecting member disposed between the power-plant and the center member is formed as an elastic body, vibrations of the power-plant during operation are prevented from being transmitted to the center member.

BRIEF DESCRIPTION OF THE DRAWINGS

The above and other objects and features of the present invention will be apparent to those skilled in the art from the following description of a preferred embodiment thereof when considered in conjunction with the appended drawings, in which the same numerals have been used to designate the same or similar elements throughout and in which:

FIG. 27 a side view showing a front body of an automotive vehicle in accordance with still a further preferred embodiment of the present invention;

FIG. 28 a plan view of the front body shown in FIG. 27; and

DETAILED DESCRIPTION OF THE INVENTION

Figure 1:
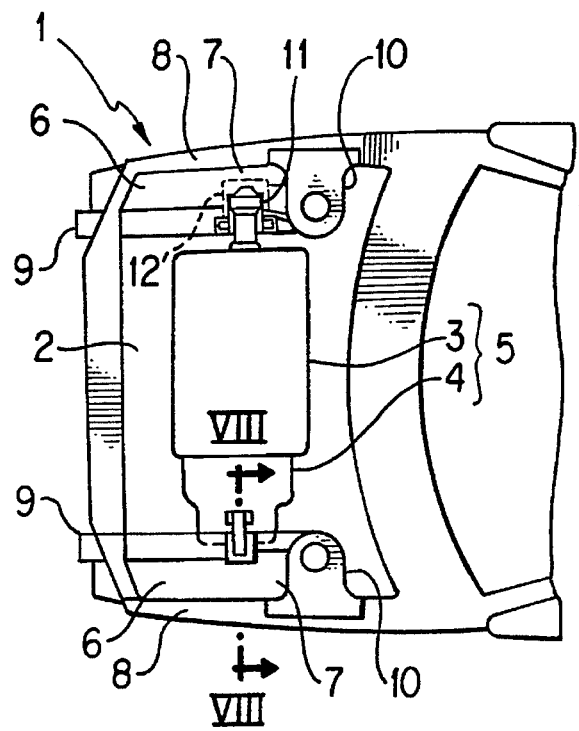
FIG. 1 is a schematic illustration showing a front body of an automotive vehicle in accordance with a preferred embodiment of the present invention.
Figure 2:
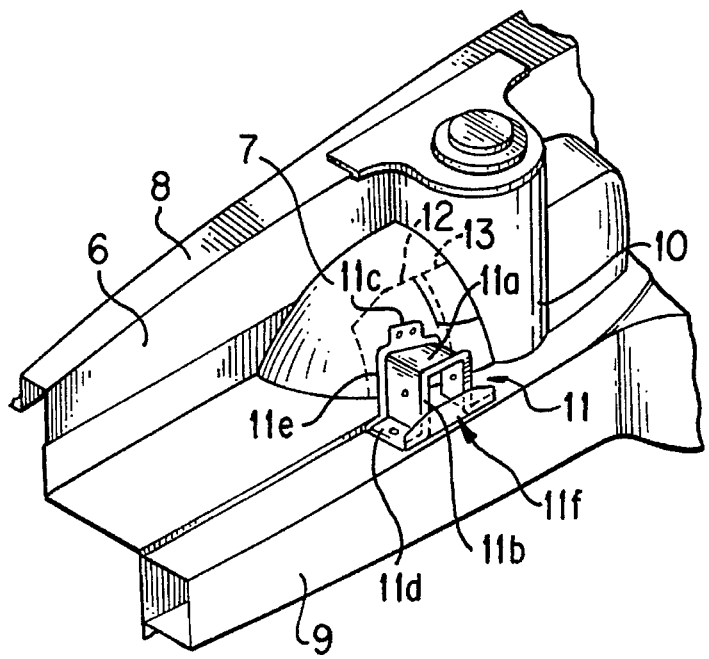
FIG. 2 is a perspective view of a right side portion of the front body shown in FIG. 1.
Figure 3:
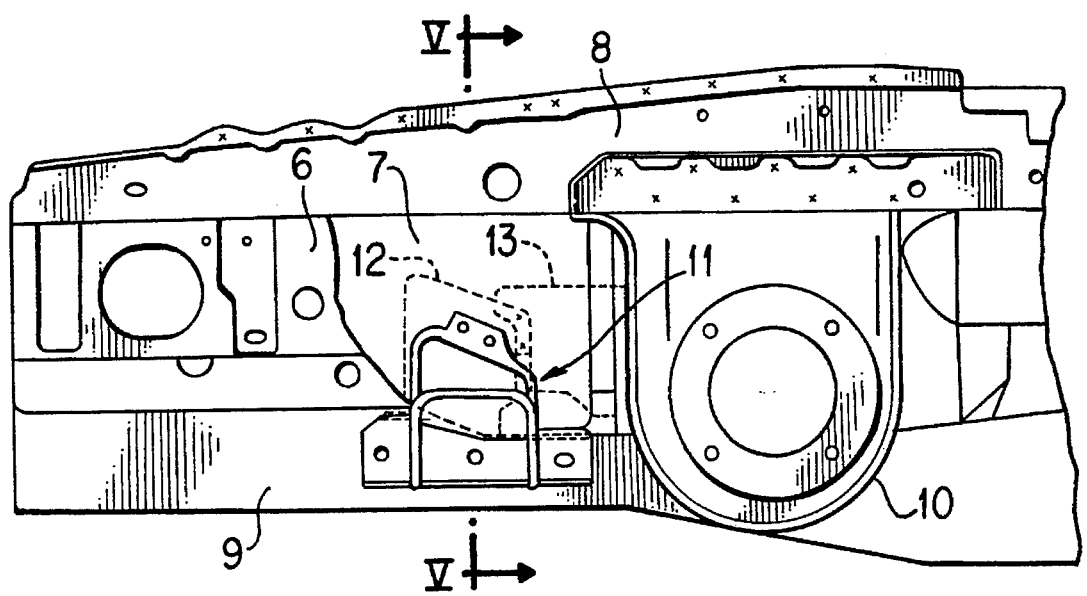
FIG. 3 is a plan view of a right side portion of the front body shown in FIG. 1.
Figure 4:
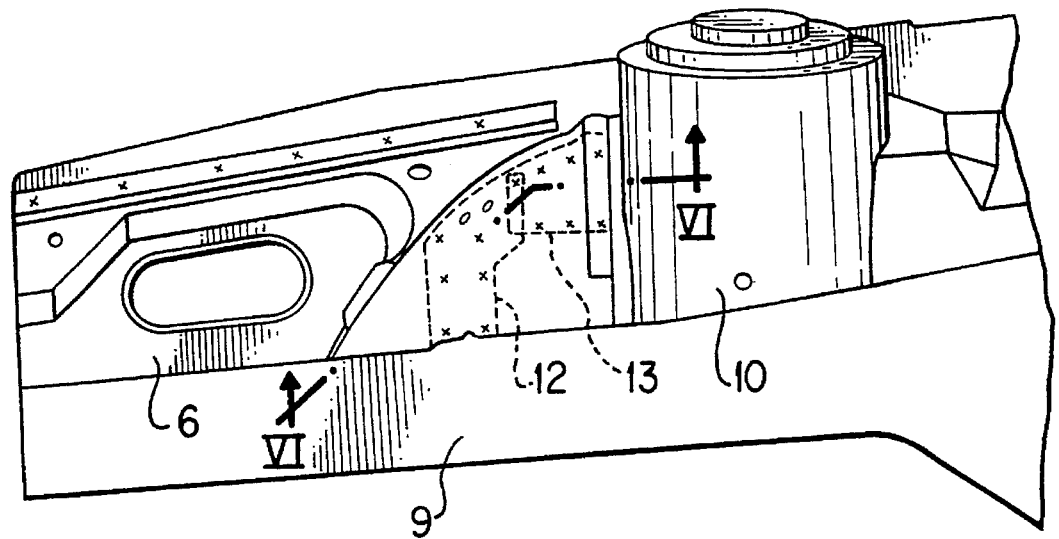
FIG. 4 is a side view of a right side portion of the front body shown in FIG. 1.
Figure 5:
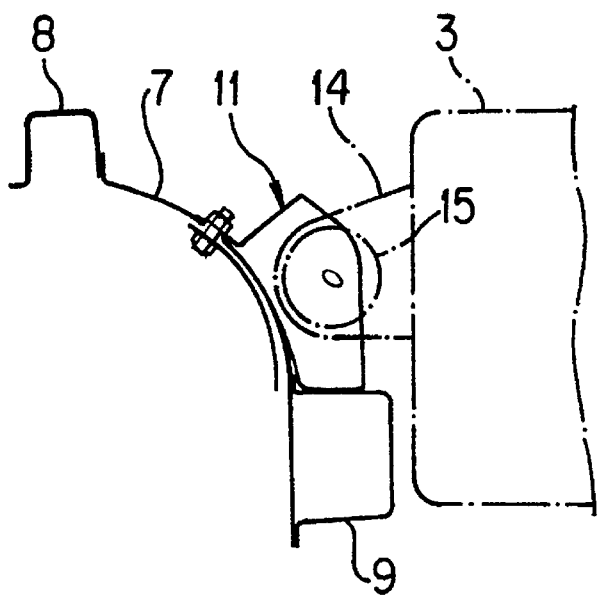
FIG. 5 is a cross-sectional view of FIG. 3 along line V—V.

Because front body structures are well known in the art, the present description will be directed, in particular, to structures or elements forming parts of, or cooperating with, the novel structure in accordance with the present invention. It is to be understood that structures or elements not specifically shown or described can take various forms well known to those skilled in the art.

It should be noted that the words "front" and "rear" in this specification indicate directions toward the forward end and back end of the a vehicle, respectively, the words "right" and "left" in this specification indicate directions toward the right side and left side of the vehicle, and the words "lengthwise" and "transverse" mean directions extending from the "front" to the "rear" and from the "right" to the "left" or vice versa, respectively.

Referring to the drawings and, in particular, to FIGS. 1 to 8, a front body 1 of an automotive vehicle, such as a front drive vehicle, according to a preferred embodiment of the present invention, is shown. A power-plant 5 is mounted in an engine room 2, which includes at least an engine 3 and an automatic transmission 4. The engine 3 is arranged so as to orient its crankshaft in the transverse direction. The engine is supported at its right side by means of mounting bracket 11 attached at the right to a front wheel housing 7. The automatic transmission 4 is supported at its middle portion by means of a mounting bracket 20 attached at the left to the front wheel housing 7. The power-plant 5, which is an integral unit of the engine 3 and the automatic transmission 4, is supported at more than two positions by means of an auxiliary frame by which suspension apparatuses are also supported.

As in ordinary front bodies, the front body 1 is provided with right and left wheel aprons 6, right and left wheel housings 7 which form parts of the wheel aprons 6, respectively, left and right wheel apron reinforcements 8 disposed above the wheel aprons 6, left and right front side frame 9 secured to lower portions of the wheel aprons 6, and left and right suspension towers 10. All of these structural elements are arranged symmetrically with respect a lengthwise center line of the vehicle body.

Mounting bracket 11 and a portion of the right wheel housing 7 at which the mounting bracket 11 is attached are structurally reinforced as shown in FIGS. 2 to 6. The mounting bracket 11 is welded, or otherwise secured, to a front portion of the right wheel housing 7, which is located in front of the suspension tower 10 (which is hereafter referred to as mounting portion). The mounting portion of the wheel housing 7 is provided with a mount reinforcement 12, in the form of a rectangular plate, welded to the inner surface of the wheel housing 7. The mount reinforcement 12 is connected to the suspension tower 10 by means of a connection reinforcement 13, in the form of a rectangular plate, welded to the inner surface of the wheel housing 7. The mount reinforcement 12 is thicker than the connection reinforcement 13. For instance, the mount reinforcement 12 and the connection reinforcement 13 have thicknesses of approximately 1.00 mm. and 0.8 mm., respectively, when the wheel housing 7 has a thickness of approximately 0.7 mm.

Mounting bracket 11 has a bracket body, which comprises an upper wall 11a and a pair of, or front and rear, vertical walls 11b, all of which are formed integrally, and a bracket base 11f on which the front and rear walls 11b, are welded. Flanges 11d, formed at lower ends of the front and rear walls 11b, and an outer flange 11c, formed at the outer side of the upper wall 11a, are connected by vertical flanges 11e, formed along vertical edges of the front and rear walls 11b. The mounting bracket 11 is held by its outer flange bracket 11c to the mounting portion of the wheel housing 7 and the mount reinforcement 12 below the wheel housing 7, the front and rear flanges 11d and the bracket base 11f bolted to upper wall portion 9a of the front side frame 9, and the flanges 11e abutting against the mounting portion of the wheel housing 7. To the mounting bracket 11, a bracket 14, formed integrally with, or secured to, the right end portion of the engine 3, is connected through a rubber bush 15.

Figure 6:
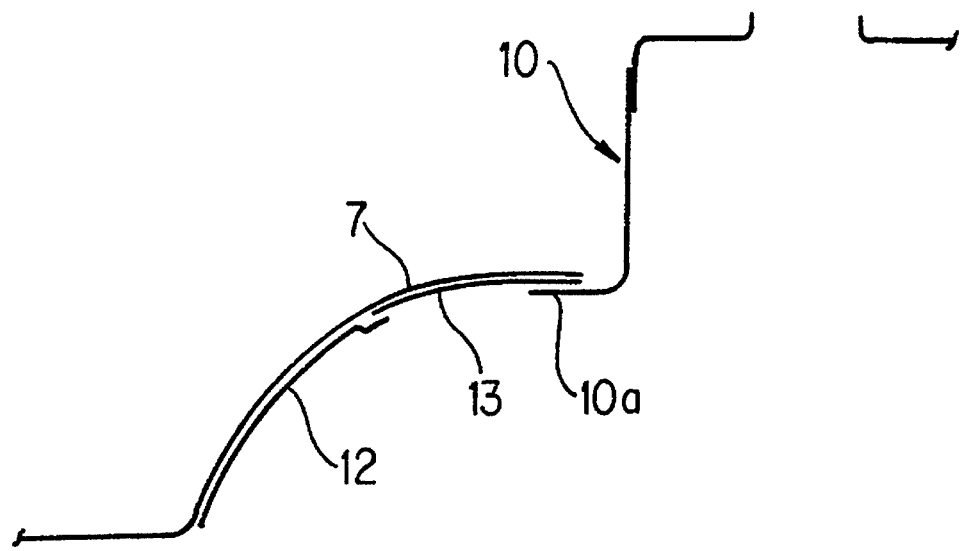
FIG. 6 is a cross-sectional view of FIG. 4 along line VI—VI.

Mount reinforcement 12 has such a size and shape as to cover the whole area of the mounting portion of the wheel housing 7 and reinforce structurally the mounting portion of the wheel housing 7, thereby increasing the connecting strength between the mounting portion of the wheel housing 7 and the front side frame 9. The mount reinforcement 12 is welded, or otherwise secured, at its major portion to an inner surface of the mounting portion of the wheel housing 7 at several points and at its lower portion to the front side frame 9 (see FIG. 5). The rear end of the mount reinforcement is located at a predetermined distance from the suspension tower 10. The connection reinforcement 13, which interconnects the mount reinforcement 12 and the suspension tower 10 with a proper connecting strength, non-elastically deforms due to an impact load which is exerted, during a front end collision, on the mounting portion of the wheel housing 7 and the mount reinforcement 12 from the power-plant 5 through the mounting bracket 11. The impact load is partly transmitted to the suspension tower 10 so as to absorb the impact load. In order to cause a proper deformation, the connection reinforcement 13, which is made thinner than the mount reinforcement 12, is disposed between an upper portion of the mount reinforcement 12 and the suspension tower 10 within the wheel house portion 7 and is welded to the wheel housing 7 at several points. The connection reinforcement 13 is welded at its rear end to an upper surface of the flange portion 10a of the suspension tower 10 and at its front end to the upper rear end portion of the mount reinforcement 12, as shown in FIG. 6. However, the connection reinforcement 13 is located at a predetermined distance above the front side frame 9 and is not connected to the front side frame 9.

If the connection reinforcement 13 is formed as thick as the mount reinforcement 12, it provides an excessive reinforcing strength, so that the transmission of impact load during a front end collision, which is transmitted to the front pillars and the cowl of the front body from the mounting bracket 11 through the wheel house 7, the mount reinforcement 12 and the connection reinforcement 13, the suspension tower 10 and the wheel apron reinforcement 8, becomes undesirably large. It is also to be noted that if the connection reinforcement 13 is connected to the front side frame 9, the connection reinforcement 13 undesirably becomes too rigid to deform during a front end collision.

Automatic transmission 4 is supported at its right side by the left side front side frame 9 with a cut-away portion 22 through the mounting bracket 20. The cut-way portion 22 of the right side front side frame 9, which defines thereby a space within which the power-plant 5 is allowed to move in the lengthwise direction during a front end collision so as to prevent interference between the automatic transmission 4 and the front side frame 9, is reinforced in order to compensate for a decrease in structural strength of the front side frame 9 due to the provision of the cut-away portion 22.

Figure 7:
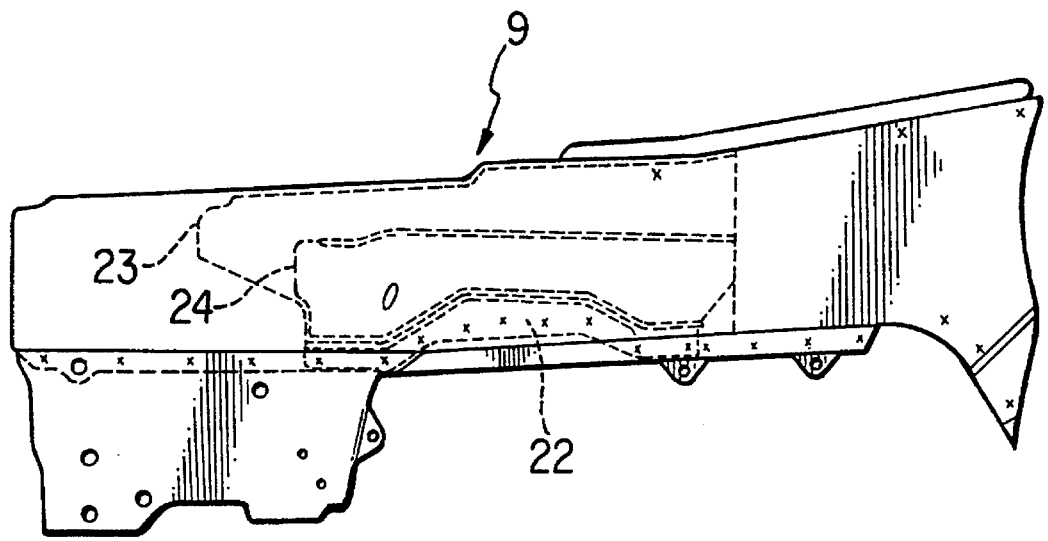
FIG. 7 is a side view showing part of a left front side frame as viewed from the outside.
Figure 8:
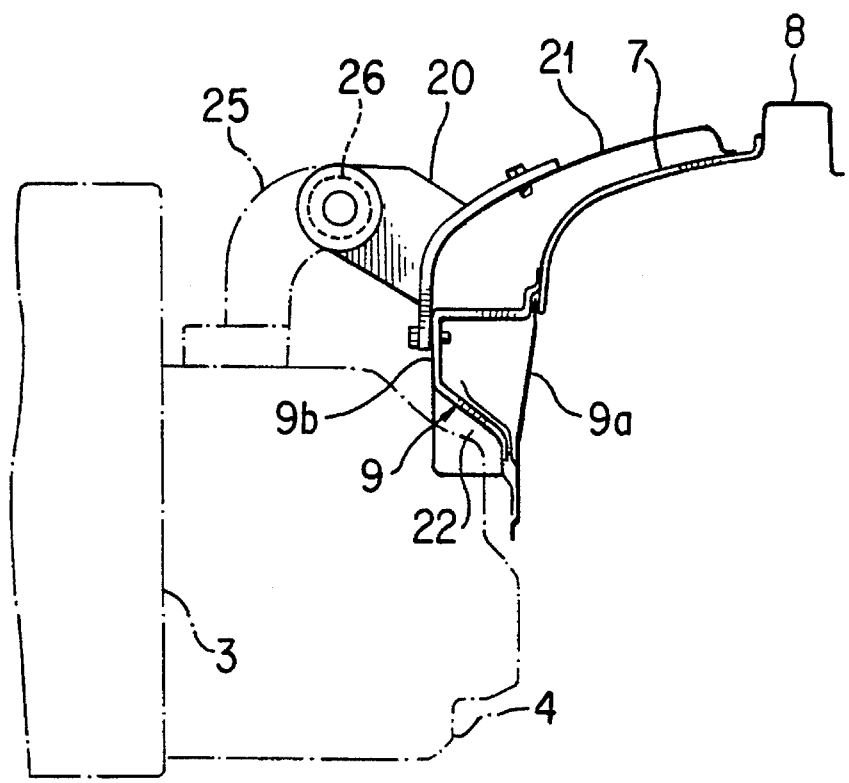
FIG. 8 is a cross-sectional view of showing FIG. 1 along line VIII—VIII.
Figure 9:
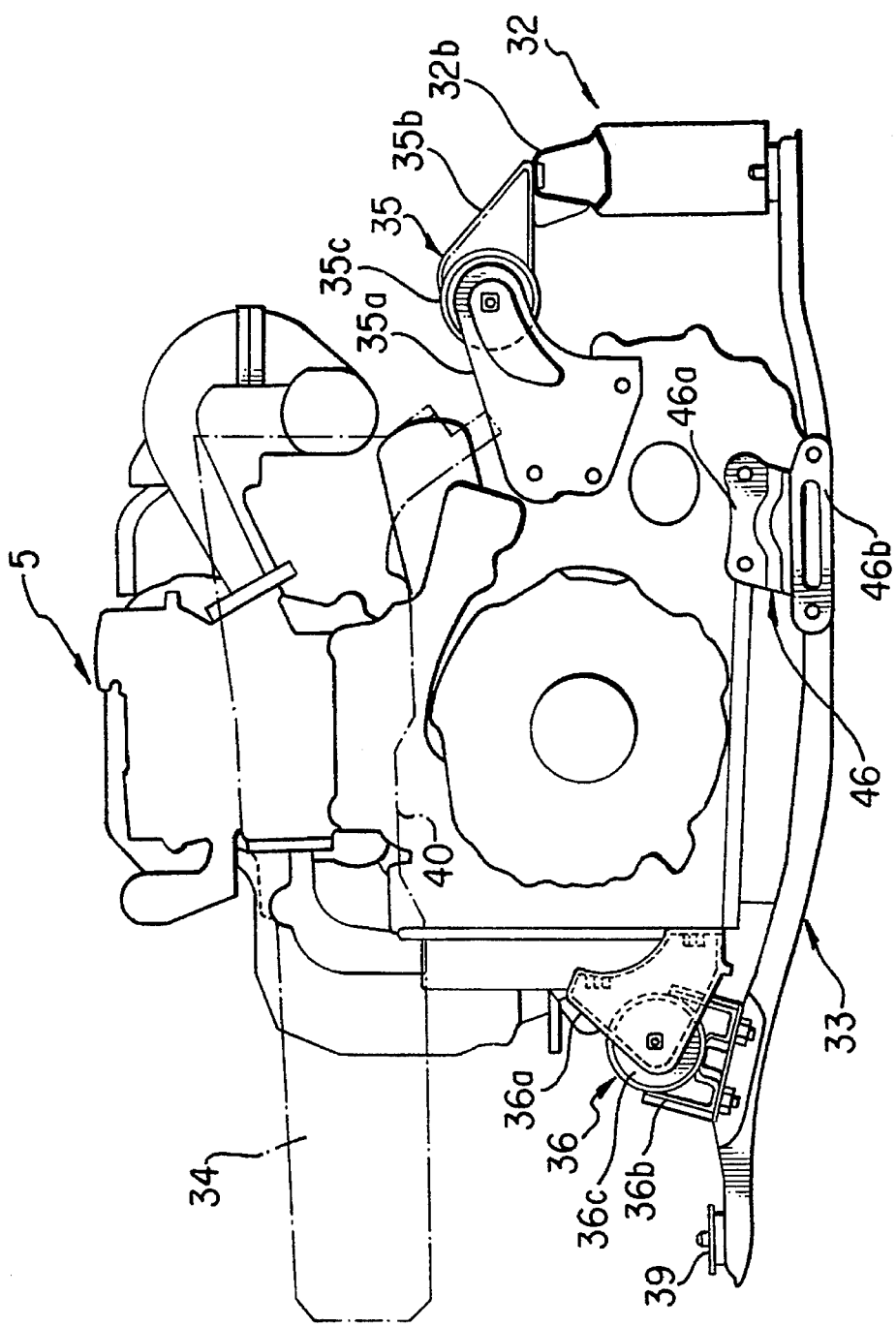
FIG. 9 a side view showing a front body of an automotive vehicle in accordance with another preferred embodiment of the present invention.
Figure 10:
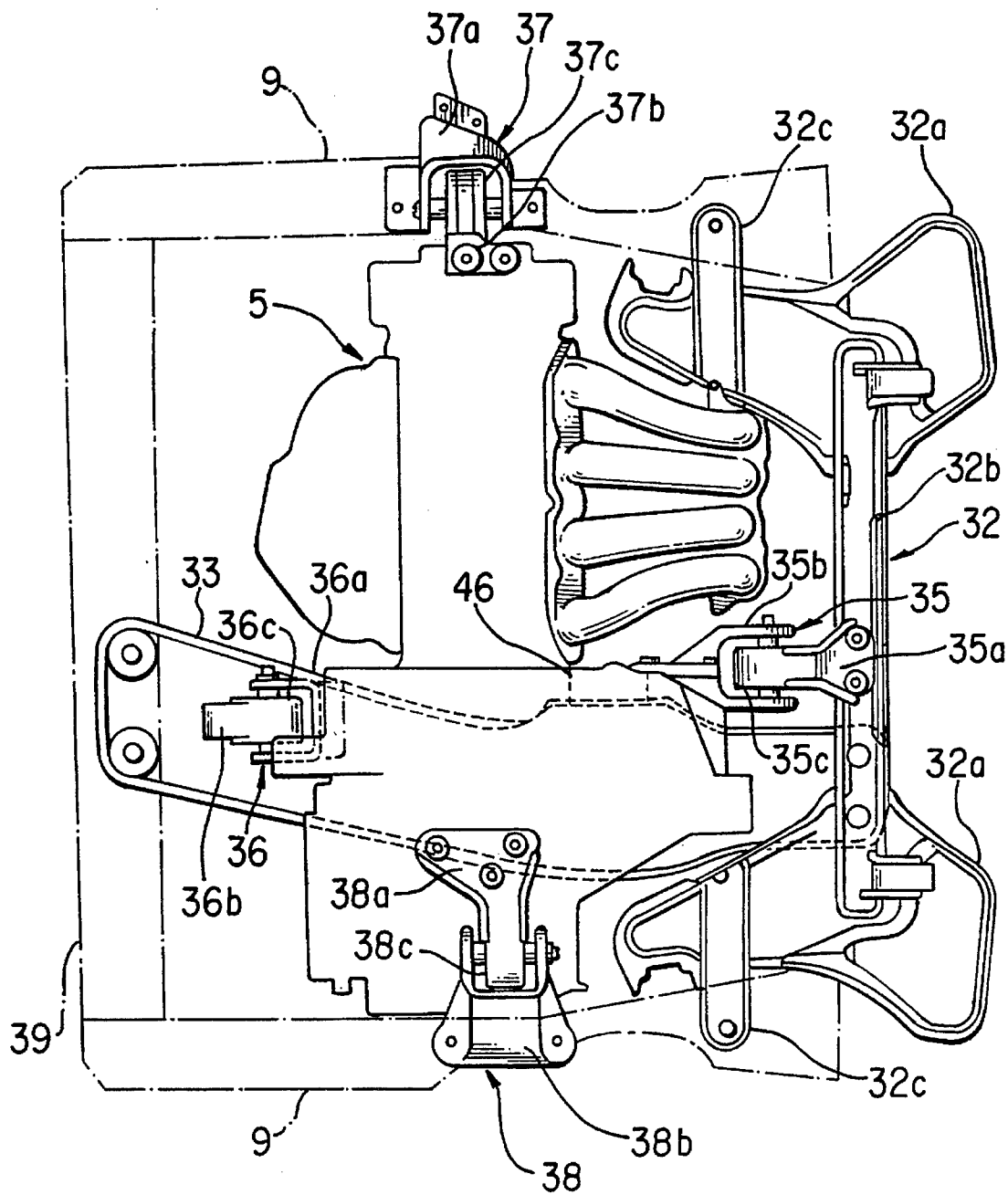
FIG. 10 a plan view of the front body shown in FIG. 9.
Figure 11:
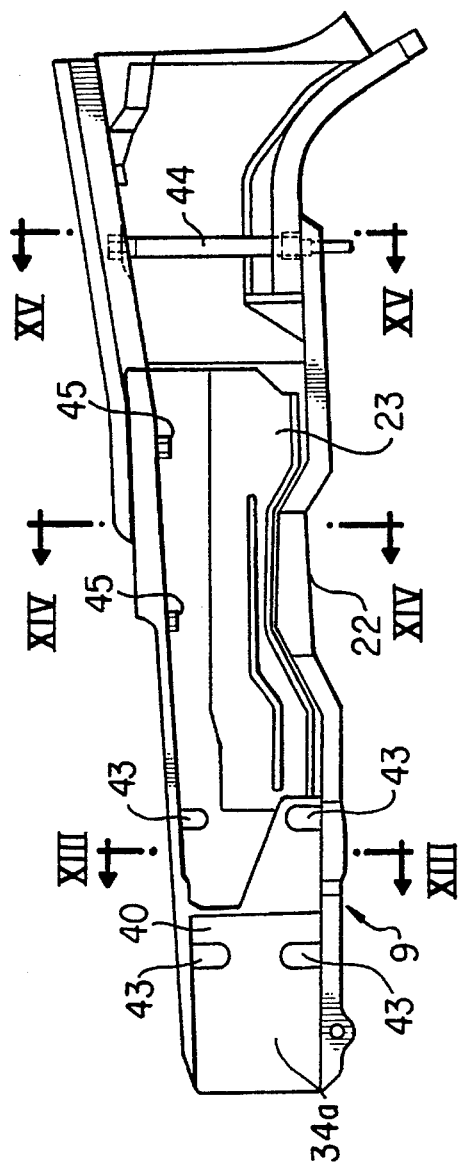
FIG. 11 is a side view showing a front side frame of the front body shown in FIG. 9.
Figure 12:
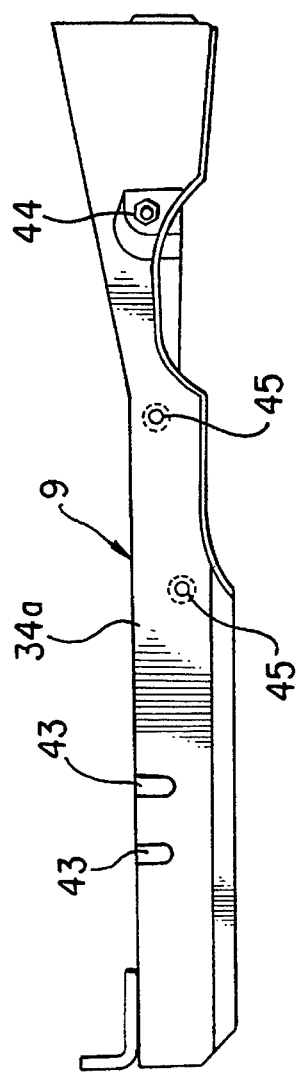
FIG. 12 is a side view showing the front side frame shown in FIG. 11.
Figure 13:
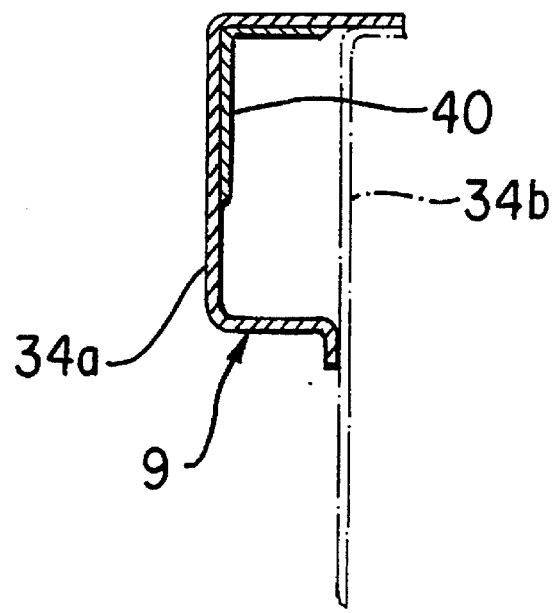
FIGS. 13 to 15 are cross-sectional views showing cross-sections of the front side frame shown in FIG. 11 along lines XIII—XIII, XIV—XIV and XV—XV, respectively.
Figure 14:
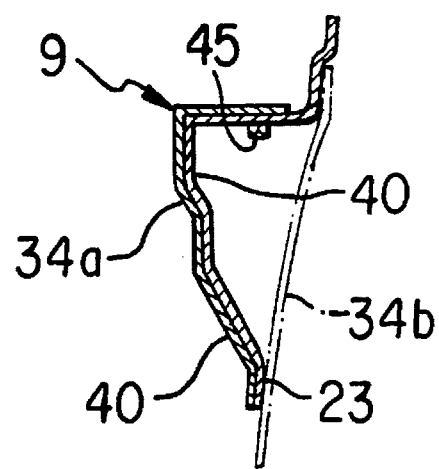
Figure 15:
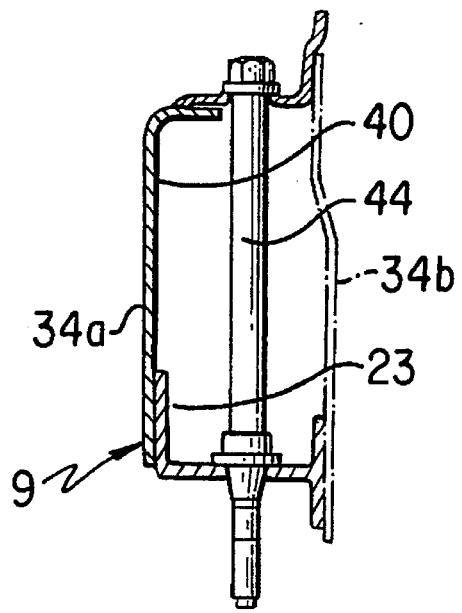

As is shown in FIGS. 7 and 8, the right side front side frame 9, having a generally rectangular, closed cross section which has a height longer than a width, is formed by a vertical outer wall 9a and an inner wall 9b having a grooved cross-section. The front side frame 9 is formed, at its middle lower portion, with an cut-away portion 22 extending in a lengthwise direction so as to define a lengthwise space for allowing lengthwise movement of the power-plant 5 so as to prevent interference of the automatic transmission 4 with the front side frame 9. If the front side frame 9 deforms upward at its central portion where the cut-away portion 22 is formed during a front end collision, the deformation affects the front pillars with the cowl of the front body 1 so as to decrease the certainty with which the wind shield glass is held. For this reason, each front side frame 9 is provided with a center reinforcement 23, in a form of a plate, secured to the inner surface of the middle portion of the wall member 9b where the cut-away portion 22 is provided. In addition, in order for the right side front side frame 9 to compensate for the decrease in structural strength due to the cut-away portion 22, an extra reinforcement 24 in a form of a plate is welded, or otherwise secured, to the center reinforcement 23. The extra reinforcement plate 24 is shaped so as to cover the whole length of the cut-away portion 22 and extend to the middle height of the front side frame 9. The extra reinforcement 24, thus structured, prevents the right side front side frame 9 from deforming or bending upward at its middle portion during a front end collision, although it is intended to allow the right side front frame to deform or bend downward at the middle portion. Between the inner wall 9b of the front side frame 9 and the wheel housing 7, there is provided a bracket reinforcement 21 for holding the mounting bracket 20, which is welded to both the upper outer surface of the inner wall 9b of the front side frame 9 and the outer surface of the wheel housing 7. The mounting bracket 20 is bolted at several points to both the bracket reinforcement 21 and the front side frame 9 and is joined to a bracket 25, integrally formed with or otherwise secured to the automatic transmission 4, through a rubber bush 26.

In the right side structure of the front body, the mount reinforcement 12, secured to the mounting portion of the wheel housing 7 where the mounting bracket 11 is secured, and the connection reinforcement 13, which is smaller in thickness than the mount reinforcement 12 and by which the mount reinforcement 12 is connected to the suspension tower 10, reinforces the mounting portion of the wheel housing 7. Connecting the mount reinforcement 12 to the suspension tower 10 through the connection reinforcement 13 provides an increased resistance of the mount reinforcement 12 against an impact load caused by a front end collision, so that lengthwise movement of the power-plant 5 is suppressed during the front end collision, thereby increasing the certainty with which the front wind shield is held and improving the safety of the the front wind shield glass. Since the connection reinforcement 13 is smaller in thickness than the mount reinforcement 12, the connecting strength between the mounting portion of the wheel housing 7 and the suspension tower 10 is not excessive but proper. Consequently, an impact load caused due to a front end collision, which is transmitted to the rear of the front body from the mounting bracket 11 through the suspension tower 10, is suppressed, so as to provide an increase in the certainty with which the front wind shield glass is held and improve the safety of the the front wind shield glass. Connecting the mount reinforcement 12 to to the front side frame 9 increases the structural strength of the mount reinforcement 12. In addition, not connecting the connection reinforcement 13 to the front side frame 9 makes the reinforcing strength of the connection reinforcement 13 lower, so as to promote the non-elastic deformation and the energy absorption of the connection reinforcement 13 during a front end collision.

On the other hand, in the left side structure of the front body, the center reinforcement 23, provided at the middle portion of the front side frame 9, restricts an upward movement of the middle portion of the front side frame 9 during a front end collision, so that the front pillars and the cowl of the front body are prevented from deformation, thereby increasing the safety of the wind shield glass. Further, the left side front side frame 9 is provided with the extra reinforcement 24 at the middle portion thereof where the cut-away portion 22 is provided, so as to compensate for a decrease in structural strength of the front side frame 9 due to the provision of cut-away portion 22 in addition to avoiding an interference of the power-plant 5 with the front side frame 9.

It is to be understood that a variety of structures may be used for the mounting bracket 11 shown in FIGS. 1 to 8 and that the reinforcements 12 and 13 may be secured to an outer surface of the wheel housing 7 as well as to the inner side of the wheel housing 7. The reinforcements may be formed by a plurality of parts or elements. Furthermore, the front side frame itself and the cut-away portion formed in the front side frame 9 are not restricted in structure and shape and may take any well known structure and shape. The cut away portion may be provided in order to avoid interference of the front side frame with a manual transmission and/or an engine as well as the automatic transmission 4 of the power-plant 5. Moreover, the center reinforcement 23 and the extra reinforcement 24 may be secured to the outer surface of the inner wall 9b of the front side frame 9 on the side of the engine room 2 as well as to the inner surface of the inner wall 9b of the front side frame 9.

Referring to FIGS. 9 to 18, a front body of an automotive vehicle according to another preferred embodiment of the present invention is shown. The front body mounts a power-plant 5, formed as one unit and including at least an engine and a transmission in an engine room. The power-plant 5 is supported by a rigid member of the front body, such as a suspension cross member 32, disposed behind the power-plant 5 through a first mounting means 35 at its rear end portion, by a center member 33, disposed under the power-plant 5 and extending in the lengthwise direction through a second mounting means 36 at its front end portion, and by left and right front side frames 9 disposed on opposite sides of the power-plant 5 and extending in the lengthwise direction through third and fourth mounting means 37 and 38 at its opposite side portions.

Suspension cross member 32 is disposed behind the power-plant 5 and extends in the transverse direction so as to be suspended between a pair of front frames (not shown). The suspension cross member 32 is formed, at its opposite ends in the transverse direction, with a pair of suspension supports 32*a* and 32*a*, respectively, for supporting a suspension means or mechanism. Between the suspension supports 32*a*, and 32*a* the suspension cross member 32 has a stepped up support portion 32*b*. The support portion 32*b* mounts the first mounting means 35 thereon at its middle portion so as to support the rear portion of the power-plant 5. Further, the suspension cross member 32 is formed at the suspension support portion 32 with a connecting portion 32*c* for connection to a rear end of the front side frame 9.

First mounting means 35 is formed by a mounting bracket 35*a* secured to the rear end portion of the power-plant 5, a mounting bracket 35*b* secured to the support portion 32*b* of the suspension cross member 32, and an elastic rubber mount 35*c* for connecting the mounting brackets 35*a* and 35*b* together. The center member 33 is disposed at the center in the transverse direction and extends in the lengthwise direction. Front and rear ends of the center member 33 extend in the transverse direction so as to be rigidly connected to an under surface of a first cross member 39 suspending the front frames and an under surface of the suspension cross member 32, respectively. Additionally, the center member 33 is slightly curved downward so as to bend easily and deform downward at its middle portion with an impact load during a front end collision. Similarly, the second mounting means 36, through which the front end portion of the power-plant 5 is supported by the front portion of the center member 33, includes a mounting bracket 36*a* secured to the front end portion of the power-plant 5, a mounting bracket 36*b* secured to the center member 33, and an elastic rubber mount 36*c* for connecting the mounting brackets 36*a* and 36*b* together. As is shown in FIGS. 11 to 15, the front side frame 9 is formed by a two-part structure 34 including an inner frame 34*a* having a generally U-shaped cross-section opened to the outside thereof and an outer frame 34*b* connected to the open side of the inner frame 34*a*. The front side frame is provided with an inner reinforcement 40 in the form of a plate welded or otherwise secured to an inner surface of the inner frame 34*a*.

In this embodiment, the cut-away portion 22, formed in the inner frame 34*a* at the middle portion, defines a sufficient space in which to place the power-plant 5 in the engine room. The cut-away portion 22 can possibly cause an upward deformation of the front side frame 9 under an impact load during a front end collision. For this reason, an inner reinforcement 40, in a form of a plate, is welded or otherwise secured to the inner surface of the inner frame 34*a* and a bead 43 formed in the inner frame so as to allow a front end portion of the front side frame 9 to crush easily. The connecting portion 32*c* of the suspension cross member 32 is connected to the front side frame 9 with a bolt 44.

Front side frame 9 is fixedly attached onto an upper surface of its middle portion with weld nuts 45 for fitting the third mounting means 37 or the fourth mounting means 38. The third mounting means 37 is formed by mounting brackets 37*a* secured to the side portion of the power-plant 5, a mounting bracket 37*b* secured to the front side frame 9 and an elastic rubber mount 37*c* for connecting these mounting brackets 37*a* and 37*b*. Similarly, the fourth mounting means 38 is formed by mounting brackets 38*a* secured to the side portion of the power-plant 5, mounting brackets 38*b* secured to the front side frame 9 and an elastic rubber mount 38*c* for connecting these mounting brackets 38*a* and 38*b*. The first to fourth mounting means 35 to 38, thus structured, serve as an anti-vibration support for the power-plant 5.

Figure 16:
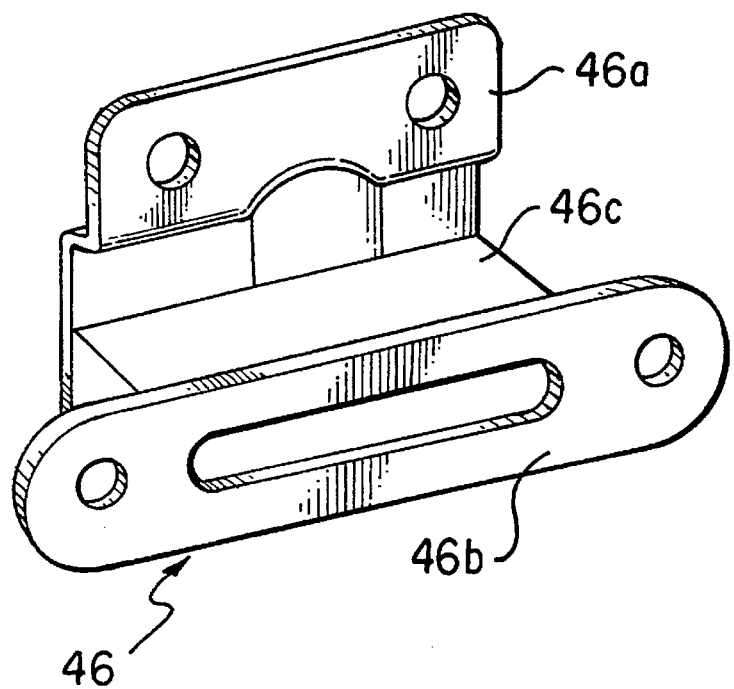
FIGS. 16 and 17 show the connecting member of the second embodiment.
Figure 17:
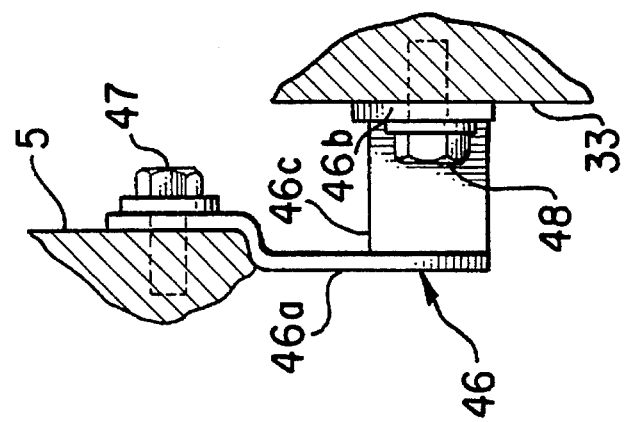

Between the first mounting means 35 and the second mounting means 36, there is provided a connecting member 46 for connecting the power-plant 5 and a portion of the center member 33 at almost the middle, in the lengthwise direction, upon a front end collision of the vehicle. As is shown in FIGS. 16 and 17, the connecting member 46 is formed by a first bracket 46*a* secured to the power-plant 5 by means of bolts 47, a second bracket 46*b* secured to the center member 33 by means of bolts 48, and an elastic member, such as a rubber mount 46*c*, for connecting these brackets 46*a* and 46*b*. The rubber mount 46*c*, which should have a proper elasticity and rigidity, may be the same as the rubber mount used in the previous embodiment.

Figure 18:
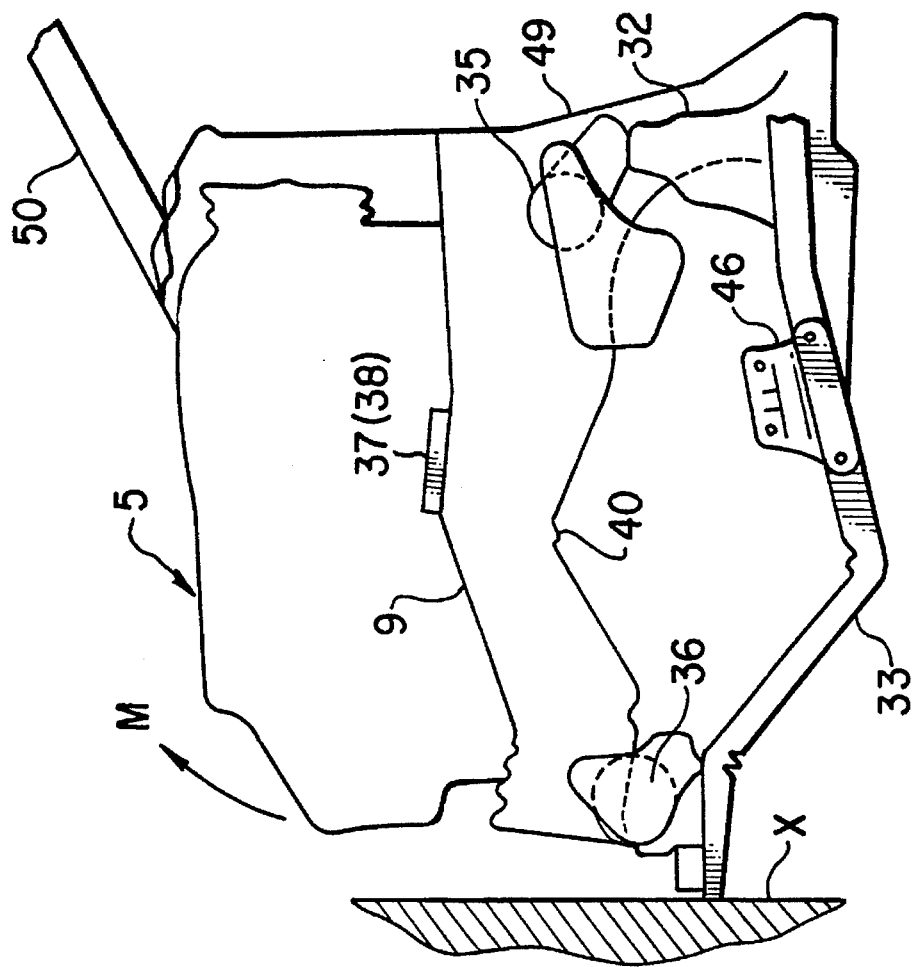
FIG. 18 is a schematic illustration showing kinetic motion of the front body upon a front end collision.

A front body structured as described above exhibits a motion upon a front end collision of the vehicle. As is shown in FIG. 18, when the front end of the vehicle crashes and an impact load is exerted on the front body from a barrier X or a crushed object, a downward deformation of the center portion of the center member 33, a crushing deformation of the front end portion of the front side frame 9, and an upward deformation of the front side frame 9 at the middle portion where the cut-away portion 22 is formed, are caused so that the power-plant 5 may possibly turn upward in a direction shown by an arrow M with its center at a rear supporting point, namely, the first mounting means 5. If an upward turning movement of the power-plant 5 is actually caused, the upper portion of the power-plant 5 interferes with a portion of the upper end portion of a dash panel 49 and wind shield glass 50, which are interconnected.

However, according to the front body of this embodiment, because of the provision of the connecting member 46 between the power-plant 5 and the center member 33, the power-plant 5 is pulled downward together with the downward deformation of the center member 33, so as to be suppressed in upward turning movement. Consequently, an interference between the power-plant 5 and the interconnected portion of the front body between the dash panel 49 and the wind shield glass 50 is effectively avoided. In addition, because the connecting member 46, disposed between the power-plant 5 and the center member 33, is formed as an elastic body, vibrations of the power-plant 5, during operation, are prevented from being transmitting to the center member 33.

Figure 19:
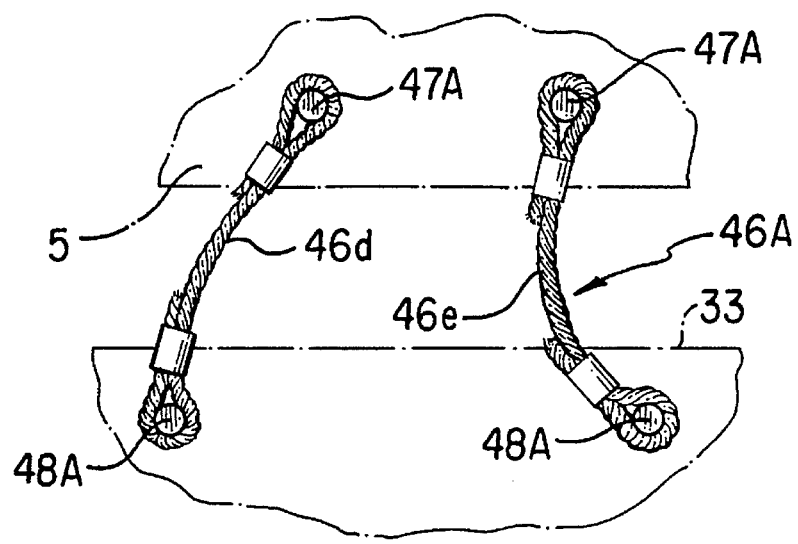
FIG. 19 is a perspective view showing a variant of a connecting member.
Figure 20:
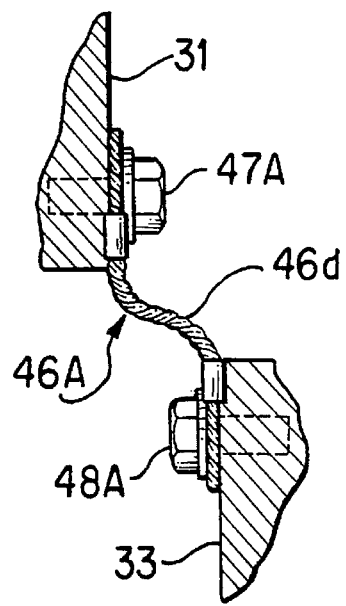
FIG. 20 is a side view of the variant of the connecting member shown in FIG. 19.

Referring to FIGS. 19 and 20, a variant of the connecting member of the front body is shown. A connecting means 46A is formed by a pair of front and rear wires 46*d* and 46*e*. Each wire 46*d* or 46*e* is secured at its one end, to the power-plant 5 by a bolt 47A and, at another end, to the center member 33 by bolts 48A. The wires 46*d* and 46*e* sag in their ordinary state. The front wire 46*d* is higher in strength than the rear wire 46*e*. The connecting means 46A, thus structured, serves to connect structurally the power plant 5 and the center member 33 with the front and rear wires 46*d* and 46*e* when the center member 33 is deformed downward, so as to suppress effectively the upward turning movement of the power-plant 5. Moreover, the front wire 46*d* has a high strength, so as to endure a large tension exerted therein during a downward deformation of the center member 33.

Because other structures and effects of this embodiment are the same as those of the previous embodiment which is shown in FIGS. 9 to 15, no description of these structures and effects is needed.

Figure 21:
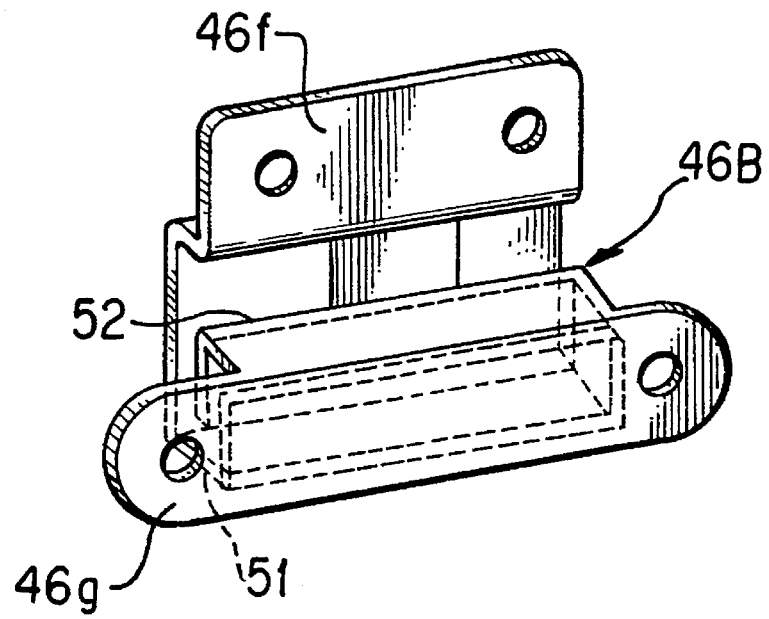
FIG. 21 is a perspective view showing another variant of the connecting member.
Figure 22:
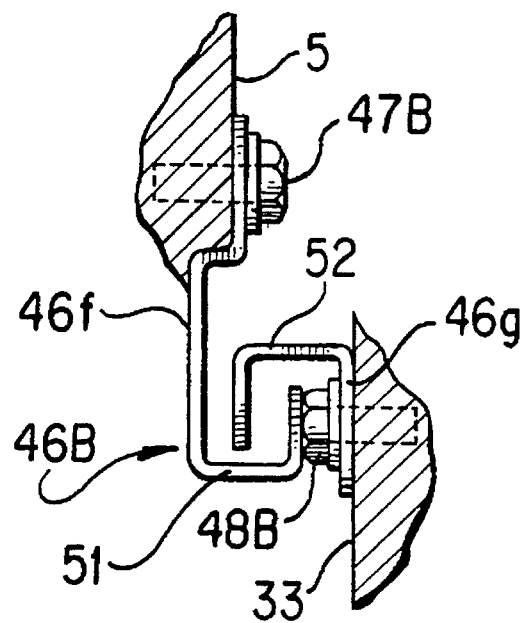
FIG. 22 is a side view of the other variant of the connecting member shown in FIG. 21.

Referring to FIGS. 21 and 22, another variant of the connecting member of the front body is shown. A connecting means 46B is formed by a first bracket 46f and a second bracket 46g. The first bracket 46f is secured to the power-plant 5 by bolts 47B and is provided with an elongated engaging member 51 having an L-shaped cross-section at its lower portion. Similarly, the second bracket 46g is secured to the center member 33 by bolts 48B and is provided with an elongated engaging member 52 having an L-shaped cross-section at its upper portion. The engaging members 51 and 52 do not engage with each other in an ordinary state of the center member 33. However, the engaging members are brought into engagement with each other when the center member 33 is deformed downward during a front end collision. In other words, the connecting means 46B operates so as to connect the power-plant 5 to the center member 33 when the center member 33 is deformed downward during a front end collision.

Connecting means 46B, thus structured structurally, connects the power-plant 5 and the center member 33 so that the center member 33, during a front end collision, operates so as to effectively suppress the upward turning movement of the power-plant 5. Since other structures and effects of this embodiment are the same as those of the previous embodiment shown in FIGS. 9 to 15, no description of these structures and effects is needed.

Figure 23:
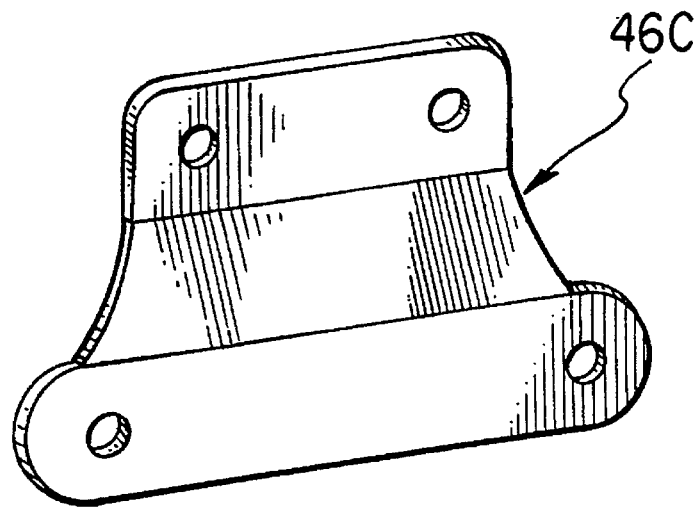
FIG. 23 is a perspective view showing still another variant of the connecting member.
Figure 24:
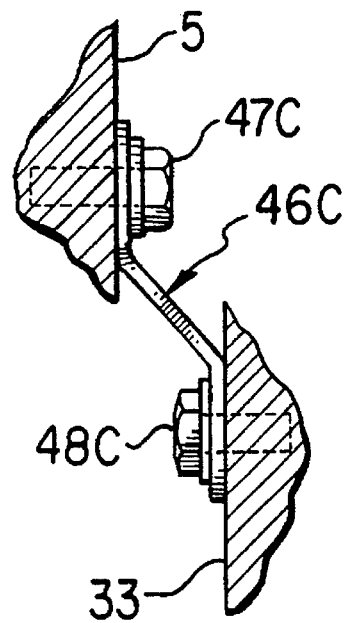
FIG. 24 is a side view of the other variant of the connecting member shown in FIG. 23.

Referring to FIGS. 23 and 24, still another variant of the connecting means of the front body is shown. In this variant, the connecting means is made of a pressed metal plate. The connecting member 46C interconnects the power-plant 5 and the center member 33 in an ordinary state. In this embodiment, although the connecting member 46C allows vibrations of the power-plant 5, during a driving operation, to be transmitted to the center member 33, it increases a force pulling down the power-plant 5 when the center member 33 is deformed downward.

Figure 25:
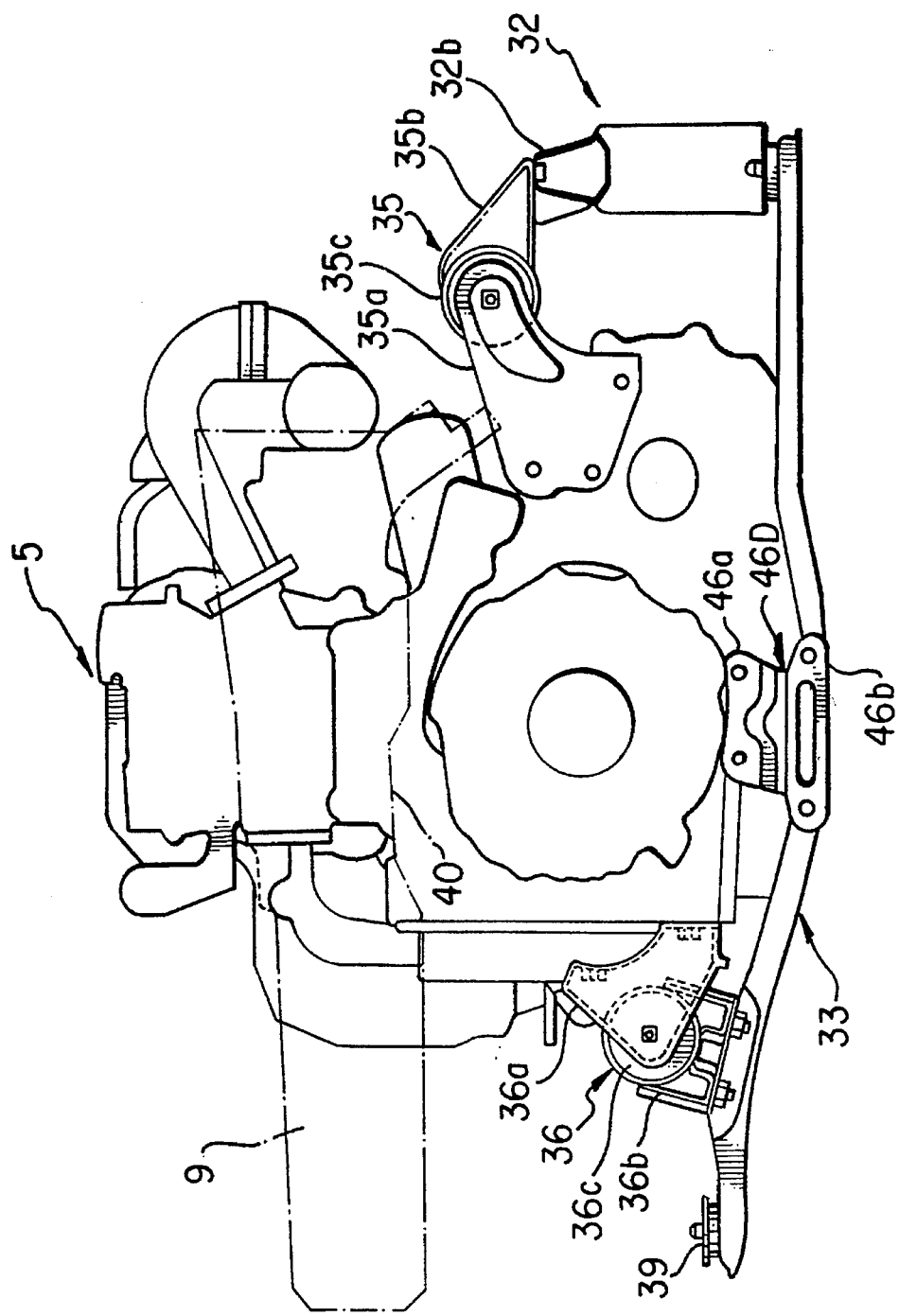
FIG. 25 a side view showing a front body of an automotive vehicle in accordance with still another preferred embodiment of the present invention.
Figure 26:
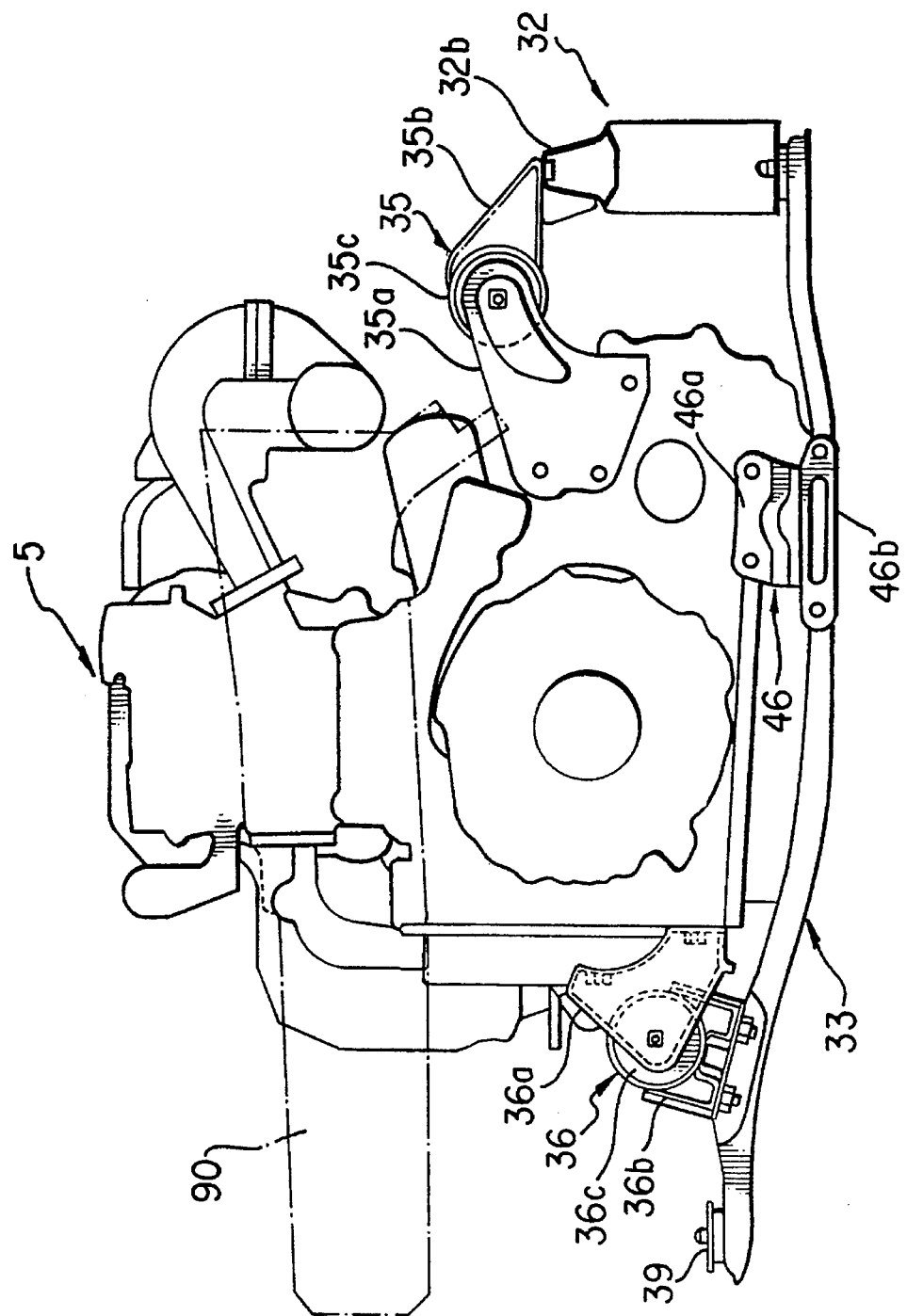
FIG. 26 a plan view of the front body shown in FIG. 25.
Figure 31:
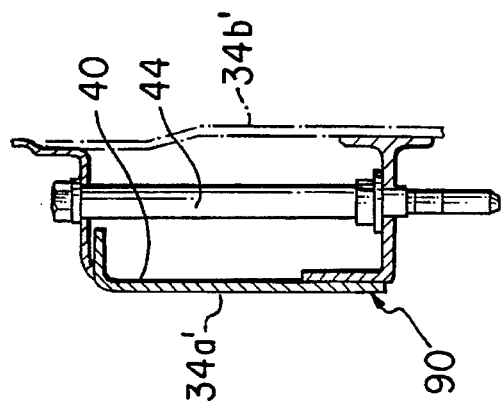
FIGS. 29 to 31 are cross-sectional views showing cross-sections of the front side frame shown in FIG. 27 along lines XXIX—XXIX, XXX—XXX and XXXI—XXXI, respectively.
Figure 29:
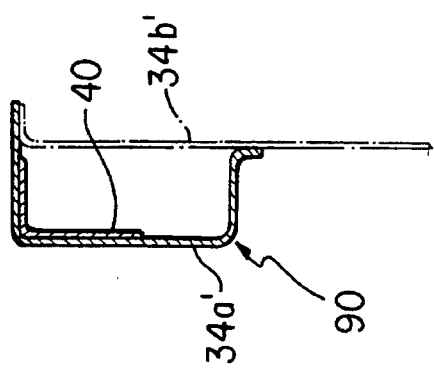
Figure 30:
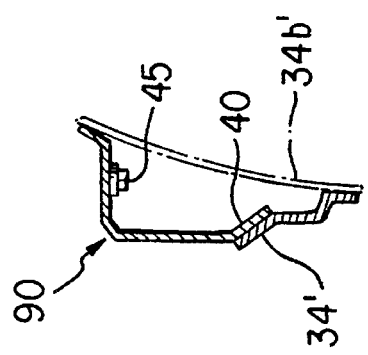

Referring to FIG. 25, a front body in accordance with another preferred embodiment of the present invention is shown, in which a connecting member 46D is provided between a power-plant 5. The connecting member 46D a center member 33 and is located at a position in the transverse direction which approximately corresponds to a transverse position below a portion of the front side frame 9 at which the front side frame 9 undergoes a maximum upward deformation, namely a portion of the front side frame 9 where a cut-away portion 22 is formed.

In the front body, thus structured, a force, which is generated by an upward deformation of the front side frame 9 during a front end collision and with which third and fourth mounting means 37 and 38 are forced upward, is cancelled or compensated for by a force with which the connecting member 46D is forced downward due to a downward deformation of the center member 33. Consequently, the power-plant 5 is more effectively prevented from turning upward during a front end collision. The front body of this embodiment may use any of the connecting members shown in FIGS. 19 to 24 in place of the connecting member 46D.

Referring to FIGS. 26 to 31, a front body in accordance with a further preferred embodiment of the present invention is shown. In this embodiment, no cut-away portion is formed in a front side frame 90. The front side frame 90 of this embodiment is structured so that it is hard to bend and deform upward at its middle portion during a front end collision. Other structures and effects of the front body of this embodiment are the same as those of the previous front bodies described in conjunction with FIGS. 1 to 15. According to this embodiment, although the upward turning movement of the power-plant 5, due to a front end collision is as small due to a a decreased upward deformation of the front side frame 90 at its middle portion, a downward deformation of the center member 33 and a crushing deformation of the front side frame 90 at is front end portion occur. Consequently, the connecting member 46 can effectively suppress the upward turning movement of the power-plant 5. The front body of this embodiment may use any of the connecting members shown in FIGS. 19 to 24 in place of the connecting member 46D.

It is to be understood that although the present invention has been described in detail with respect to preferred embodiments thereof, various other embodiments and variants may occur to those skilled in the art. Any such other embodiments and variants which fall within the scope and spirit of the invention are intended to be covered by the following claims.

What is claimed is:

1. A front body structure of a vehicle body for an automotive vehicle in which a power-plant is mounted, said front body structure comprising:

a pair of front side frames extending lengthwise of said automotive vehicle;

a cross member extending transversely of said automotive vehicle and connected at opposite ends to said front side frames;

a rigid member disposed behind said power-plant and connected at opposite ends to said front side frames;

a center member disposed below said power-plant, extending in a lengthwise direction of said vehicle body and connected at opposite ends to said cross member and said rigid member, said center member having means for bending downward so as to easily deform downward upon an occurrence of a front end collision of said automotive vehicle;

first mounting means for connecting a rear end portion of said power-plant to said rigid member;

second mounting means for connecting a front end portion of said power-plant to said center member; and connecting means, disposed between said first mounting means and said second mounting means, for interconnecting said power-plant and said center member and allowing the power-plant to be pulled downward together with downward deformation of said center member upon the occurrence of said front end collision of said automotive vehicle.

2. A front body structure as recited in claim 1, wherein said connecting means comprises an elastic connecting member.

3. A front body structure as recited in claim 1, wherein said connecting means is disposed at a middle portion of said center member, and further comprising third and fourth mounting means for connecting said power-plant at opposite sides thereof to said front side frames respectively.

4. A front body structure recited in claim 3, wherein said connecting means is located at a transverse position which approximately corresponds to a position of a portion of a front side frame at which the front side frame shows a maximum upward deformation.

5. A front body structure as recited in claim 3, wherein one of said pair of front side frames is formed, at the middle portion thereof, with a cut-away portion opening to an outside of the vehicle body so as to allow the power-plant to move without interference with one of said front side frames and is provided with an inner reinforcement secured thereto to compensate for a decrease in structural strength of one of said front side frames due to a provision of said cut-away portion.

6. A front body structure as recited in claim 5, wherein at least one of said third and fourth mounting means comprises an engine mounting bracket disposed on one of said pair of front side frames.

* * * * *